(12) United States Patent
Delobel et al.

(10) Patent No.: US 10,099,568 B2
(45) Date of Patent: Oct. 16, 2018

(54) MANAGEMENT OF THE CHARGE OF A BATTERY

(71) Applicant: RENAULT s.a.s., Boulogne-Billancourt (FR)

(72) Inventors: Bruno Delobel, Issy-les-Moulineaux (FR); Antoine Saint-Marcoux, Palaiseau (FR); Marc-Henri Giraud, Issy-les-Moulineaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 40 days.

(21) Appl. No.: 14/761,204

(22) PCT Filed: Jan. 16, 2014

(86) PCT No.: PCT/FR2014/050079
§ 371 (c)(1),
(2) Date: Aug. 20, 2015

(87) PCT Pub. No.: WO2014/111659
PCT Pub. Date: Jul. 24, 2014

(65) Prior Publication Data
US 2015/0352966 A1    Dec. 10, 2015

(30) Foreign Application Priority Data

Jan. 17, 2013  (FR) ..................................... 13 50408

(51) Int. Cl.
*H02J 7/04*    (2006.01)
*B60L 11/18*   (2006.01)
(Continued)

(52) U.S. Cl.
CPC ......... *B60L 11/185* (2013.01); *B60L 11/1862* (2013.01); *H01M 10/44* (2013.01);
(Continued)

(58) Field of Classification Search
CPC ..................................................... B60L 11/185
(Continued)

(56) References Cited

U.S. PATENT DOCUMENTS 5,568,039 A    10/1996  Fernandez
6,121,761 A *   9/2000  Herbert .................. H02M 3/07
                                                    323/222

(Continued)

FOREIGN PATENT DOCUMENTS

DE    101 58 062 A1   7/2002
FR    2 963 855 A1    2/2012
(Continued)

OTHER PUBLICATIONS

International Search Report dated May 21, 2014, in PCT/FR2014/050079, filed Jan. 16, 2014.
(Continued)

*Primary Examiner* — Suresh Memula
(74) *Attorney, Agent, or Firm* — Oblon, McClelland, Maier & Neustadt, L.L.P.

(57) ABSTRACT

A method for managing the charge of a battery comprising: control of a rapid charging phase at increasing voltage, followed by control of an absorption phase at decreasing current regulated to a first voltage value, and in which the rapid charging phase is controlled until the voltage at the terminals of the battery reaches a second voltage value that is strictly higher than the first voltage value.

9 Claims, 4 Drawing Sheets

(51) Int. Cl.
  *H02J 7/00* (2006.01)
  *H01M 10/44* (2006.01)
  *H01M 10/42* (2006.01)
(52) U.S. Cl.
  CPC ..... *H02J 7/007* (2013.01); *H01M 2010/4271* (2013.01); *H01M 2220/20* (2013.01); *Y02T 10/7005* (2013.01); *Y02T 10/7072* (2013.01); *Y02T 90/121* (2013.01); *Y02T 90/128* (2013.01); *Y02T 90/14* (2013.01)
(58) Field of Classification Search
  USPC ........................................................ 320/162
  See application file for complete search history.

(56) References Cited

U.S. PATENT DOCUMENTS

| | | |
|---|---|---|
| 6,456,042 B1 | 9/2002 | Kwok |
| 2008/0036426 A1* | 2/2008 | Kung ................... H02J 7/0031 320/160 |
| 2010/0225283 A1* | 9/2010 | Hsia ...................... G06F 1/1632 320/167 |
| 2014/0002027 A1* | 1/2014 | Guan ................... H02J 7/0014 320/128 |
| 2014/0217994 A1* | 8/2014 | Kuo ...................... H02J 7/0034 320/160 |

FOREIGN PATENT DOCUMENTS

| WO | WO 9619026 A1 | 6/1996 |
|---|---|---|
| WO | WO 2008/056316 A1 | 5/2008 |
| WO | WO 2011/122946 A2 | 10/2011 |

OTHER PUBLICATIONS

French Preliminary Search Report dated Nov. 5, 2013, in Patent Application No. FR 1350408, filed Jan. 17, 2013.

* cited by examiner

MANAGEMENT OF THE CHARGE OF A BATTERY

The invention relates to the management of the charge of a battery, notably of a battery of an electric or hybrid vehicle.

The charging time of a battery may affect a customer's choice between an electric vehicle and another type. In order to speed up the charging process, it is possible to charge the battery with a relatively high voltage but this can degrade the battery and hence limit its lifetime.

The aim is therefore, in general, to reach a compromise between charging time and lifetime of the battery.

A known solution, for example from the document WO2011122946, is to manage the charging of a battery in two phases:

A fast charge phase (referred to as "boost") in which the voltage across the terminals of the battery rises until it reaches a limiting voltage value necessary corresponding to the desired capacity or to the desired charged energy. During this first phase, the battery may for example be charged at constant current.

An absorption phase during which the voltage across the terminals of the battery remain relatively constant around this limiting voltage value. During this second phase, the voltage may for example be maintained around this limiting value, such that the charge current decreases with the time. Applying a constant current may also be envisaged and, when the limiting voltage value is reached, this current may be reduced by a given factor, for example 0.8. This is referred to as "multistep charging".

There exists a need for a higher performance battery charging procedure in terms of a compromise charging rate/battery lifetime.

A method is provided for management of the charge of a battery of an automobile vehicle for example comprising:
controlling a fast charge phase at increasing voltage, then
controlling an absorption phase at decreasing current regulated at a first voltage value.

The fast charge phase is controlled until the voltage across the terminals of the battery reaches a second voltage value strictly greater than the first voltage value.

Thus, a voltage for stopping the fast charge phase is used that is higher than the voltage corresponding to the desired charged capacity and/or energy. This can allow the fast charge phase to be prolonged, this phase in fact being that for which the ratio between the charged energy/capacity and the charging time is the highest.

Furthermore, the time spent at a relatively high voltage is relatively short, which allows a certain durability of the battery to be guaranteed.

The first voltage value can advantageously correspond to a predefined maximum voltage for this battery.

Thus, during the fast charge phase, the battery is charged beyond the predefined value corresponding to this battery.

As this limiting value is in fact likely to vary during the life of the battery, for example going from 4.08 volts to 4.126 volts, the method described hereinabove can allow the unnecessary limiting of the charge to be avoided, whereas the battery is capable of absorbing a higher power without suffering damage.

The battery can for example be a battery of an electric and/or hybrid vehicle, for example a drive battery for these types of vehicles.

The invention is not to any extent limited by the manner in which the fast charge phase takes place.

For example, this fast charge phase may be controlled such that the charge current is constant during the whole of this phase or else during only a part of this phase. In another embodiment, this fast charge phase may be controlled such that the charge power is constant over the whole or over a part of the fast charge phase.

Nor is the invention limited by the way in which the absorption phase is applied, nor in particular by the manner in which the voltage is regulated at the first voltage value.

In particular, the voltage could be regulated at several voltage values, for example at a set of successive voltages ordered by decreasing values, or else for example at a first and at a second voltage value.

The absorption phase may take place right at the end of the fast charge phase, in other words as soon as it is detected that the voltage across the terminals of the battery has reached the second voltage value, or else later on.

For example, following the detection of the fact that the voltage value across the terminals of the battery has reached the second voltage value, charging at constant voltage equal to this voltage value, for a time that may be predetermined or otherwise, could be imposed.

In one embodiment, during the absorption phase, the voltage is constant. This voltage may for example be equal to the limiting voltage value corresponding to this battery, or else to one or several other values.

For example, a constant voltage equal to the second voltage value could be imposed for a predetermined period of time, then a constant voltage equal to the first voltage value imposed.

In another embodiment, a constant charge current or charge power could be imposed for as long as the voltage is lower than a target value, for example the first voltage value. As soon as the voltage across the terminals of the battery reaches the first value, the value of the charge power or of the charge current is reduced; for example a coefficient with a value lower than one, for example 0.8 or another value, is applied to the imposed voltage or power value. The adjustment is thus made by steps for regulating the voltage across the terminals of the battery at the first voltage value.

In another embodiment, a power profile may be applied in order to bring the voltage to the target value, for example the first voltage value. This power profile may for example be determined based on a modeling of the battery.

It goes without saying that the various strategies for controlling the voltage across the terminals of the battery may be combined allowing this voltage to be taken from the second voltage value to the first voltage value. For example, a constant voltage at a value equal to the second voltage value could be imposed for a period of time, then a power profile be applied.

Nor is the invention limited by the way in which the fast charge phase and the absorption phase are controlled. For example, the generation of a control signal and transmission of the signal generated to electrical connection means between the battery and a power source could be provided, for example a charging terminal, the line power, an alternator or other source.

A computer program product is furthermore provided comprising instructions for carrying out the steps of the method described hereinabove, when these instructions are executed by digital processing means for the signal, for example a processor. This computer program may be stored on a hard disk or downloaded inter alia.

A device for management of the charge of a battery of an automobile vehicle is furthermore provided comprising:

means for receiving the voltage values measured across the terminals of the battery.

processing means arranged for controlling a fast charge phase at increasing voltage, then an absorption phase at decreasing current regulated at a first voltage value, these processing means being configured for controlling the fast charge phase until a received voltage value across the terminals of the battery reaches a second voltage value higher than the first voltage value.

This device can for example comprise, or be integrated into, one or more processors, for example a microcontroller, a microprocessor or other device.

This device can be integrated into a vehicle, for example in a battery management system or BMS, or otherwise. For example, the device described hereinabove may be integrated into a charging terminal for an electric vehicle.

The reception means can for example comprise an input connector, an input port or other means. The processing means may for example comprise a central processing unit (or CPU).

A battery system for an automobile vehicle is furthermore provided comprising the device for management of the charge described hereinabove together with means for charging a battery and/or the battery itself. These charging means may for example comprise a charging terminal, an alternator or other means.

A vehicle, for example an electric and/or hybrid vehicle, is furthermore provided comprising the system and/or the device described hereinabove.

The invention will be better understood with reference to the following figures which illustrate non-limiting embodiments.

Figure 1:
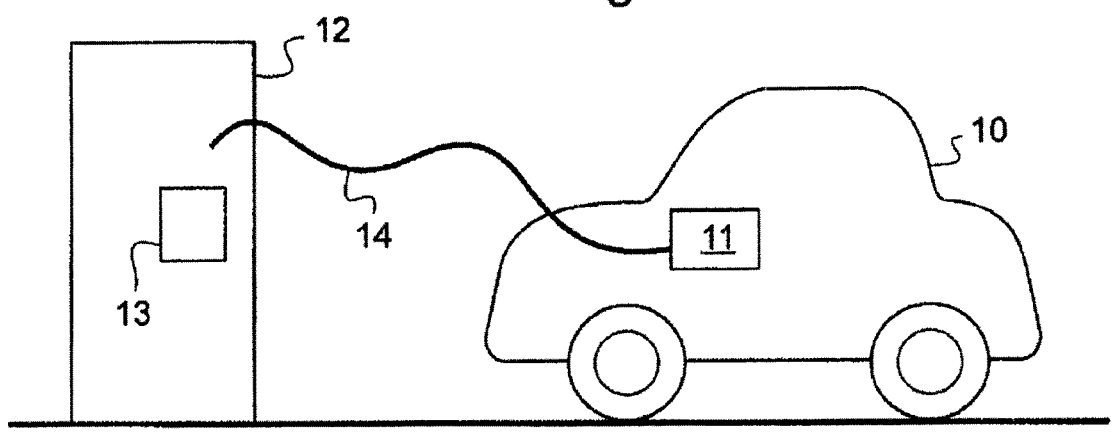
FIG. 1 shows one example of a battery charging system for an automobile vehicle, according to one embodiment of the invention.

With reference to the FIG. 1, an electric vehicle automobile 10 comprises a drive battery 11, which can be recharged by means of a charging terminal 12 connected to the electrical line supply.

The battery 11 may for example be a lithium ion battery.

The terminal 12 may for example be a fast charging terminal supplying a DC current to the battery 11 of the vehicle 10.

This terminal 12 can incorporate a charge management device 13, for example a processor. This processor comprises receiving means not shown, for example an input plug in electrical communication with sensors (not shown) of the automobile vehicle 10. The measurements coming from these sensors can thus transit via a charging cable 14 and be received by the processor 13. In particular, the processor 13 can receive measurement values of the voltage across the terminals of the battery 11. More generally, the information needed for the control of the charge current and voltage are transmitted by the vehicle 10 to the charger through the charging cable 14. The fast charging terminal 12 thus communicates with the vehicle 10, which can allow a distribution of the energy more adapted to the vehicle, and under optimal safety conditions.

In particular, the processor 13 can receive voltage values across the terminals of the battery 11. In order to obtain a faster charging, the processor 13 can impose a charging with:

a first phase with constant power during which the voltage across the terminals of the battery 11 will increase. The value of the charge power may be a function of the external temperature. Use may for example be made of charts.

and a second phase, this time with a constant voltage, for example, during which the charge of the battery will be stabilized.

In order to reduce the charging time of the battery, the fast charge phase is lengthened, at increasing voltage, until the voltage across the terminals of the battery 11 reaches a voltage value higher than the limiting voltage value necessary corresponding to the desired capacity.

For example, the battery can have a limiting voltage value of 4.08 volts, and the charging phase continues until the voltage value across the terminals of the battery reaches 4.1 volts, or even 4.126 volts.

FIGS. 2A, 2B, 3A, 3B, 4A, 4B, 5A, 5B illustrate various strategies, when the external temperature is equal to 25° C. On the other hand, the values in FIGS. 6A, 6B, 7a and 7B have been measured for an external temperature of only 15° C.

Figure 2A:
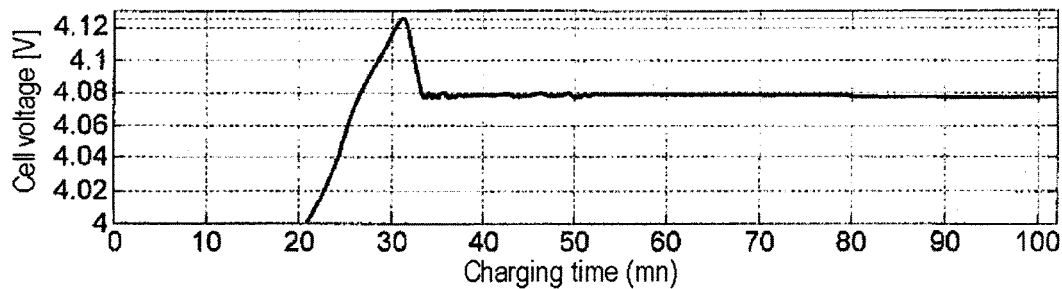
FIG. 2A is a graph showing the voltage across the terminals of a battery cell as a function of time, when a first exemplary method according to one embodiment of the invention is applied.
Figure 2B:
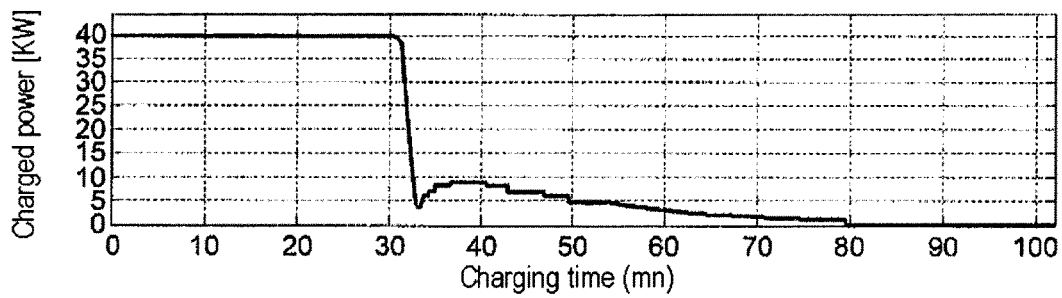
FIG. 2B is a graph showing the charge power in kW as a function of the charging time, during the application of this first exemplary method.

With reference to FIG. 2A, the fast charge phase lasts until around t=32 mn, in other words until the voltage across the terminals of the battery reaches a value of 4.126 volts. A charging with a constant voltage value at 4.08 volts is subsequently imposed.

The voltage value across the terminals of the battery thus falls rapidly until it reaches this target value, and the charging continues until around t=79 mn.

The method applied is thus advantageous, because when a constant current is applied until the voltage reaches 4.08 volts, then when this voltage is maintained at 4.08 volts, around 81 mn is needed for charging up the battery.

Figure 3A:
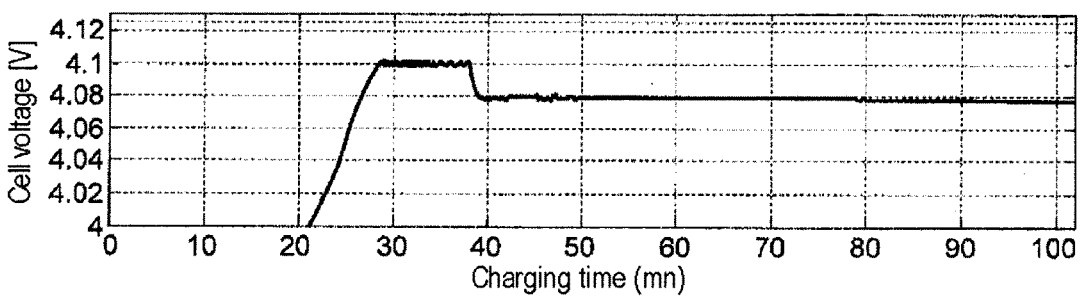
FIG. 3A is a graph showing the voltage across the terminals of a battery cell as a function of time, when a second exemplary method according to one embodiment of the invention is applied.
Figure 3B:
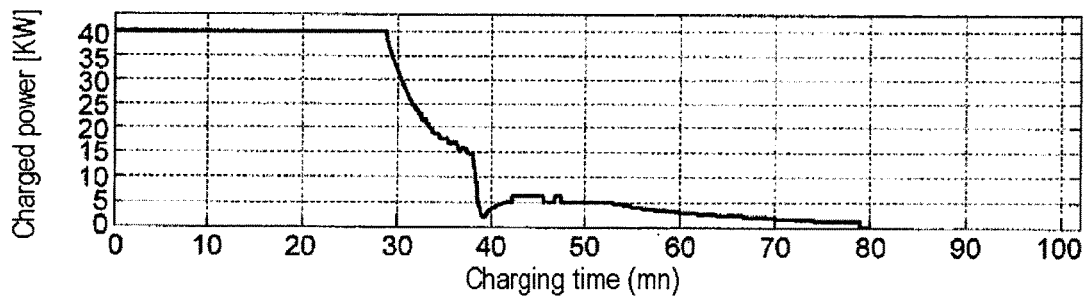
FIG. 3B is a graph showing the charge power in kW as a function of the charging time, during the application of this second exemplary method.

FIGS. 3A and 3B illustrate another strategy in which, after a fast charge phase until the voltage across the terminals of the battery reaches 4.1 volts, this voltage is held at this value of 4.1 volts for 10 mn, then a voltage of 4.08 volts is imposed. FIG. 3B shows that here again the charging time is less than 80 mn.

Figure 4A:
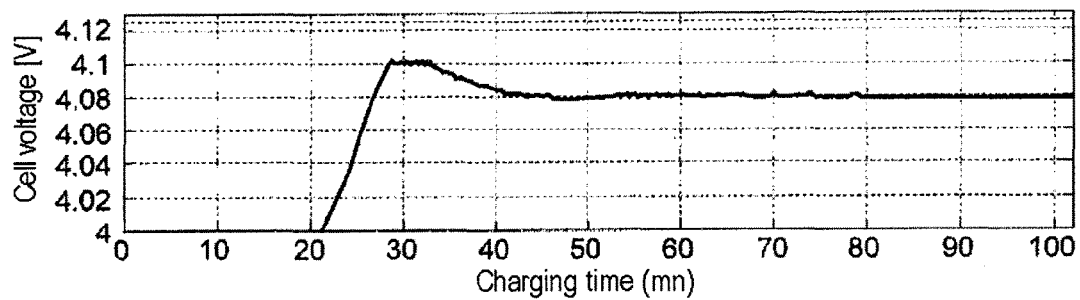
FIG. 4A is a graph showing the voltage across the terminals of a battery cell as a function of time, when a third exemplary method according to one embodiment of the invention is applied.
Figure 4B:
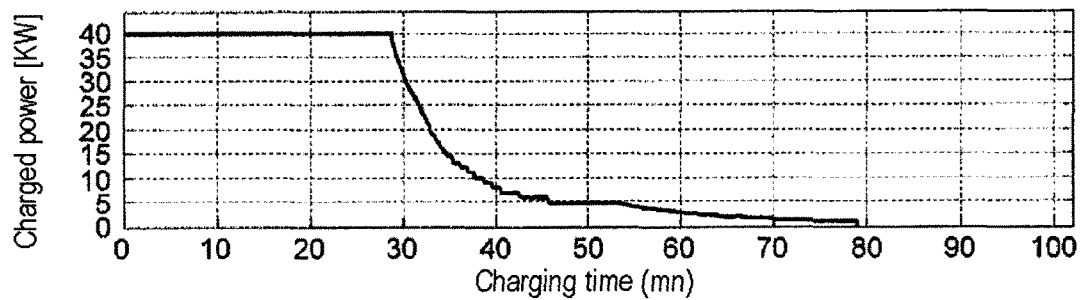
FIG. 4B is a graph showing the charge power in kW as a function of the charging time, during the application of this third exemplary method.

FIGS. 4A and 4B correspond to a third strategy in which, after a fast charge phase until the voltage across the terminals of the battery reaches 4.1 volts, a voltage of 4.1 volts is imposed for 5 mn, then power levels with a value updated each time that the voltage reaches a target value, this target value decreasing progressively until it reaches a value of 4.08 volts.

This power profile, applied starting from around t=33 mn, may be obtained based on a modeling of the battery.

For example, knowing the charge power applied and the current voltage across the terminals of the battery, it is possible to know the voltage across the terminals of the battery at the time of the next sampling.

Using this modeling of the battery, the power to be applied at each sampling step in order to reach a voltage of 4.08 volts at the end of a predetermined time can be calculated.

When this strategy is applied, the charging time is also slightly less than 80 mn.

Figure 5A:
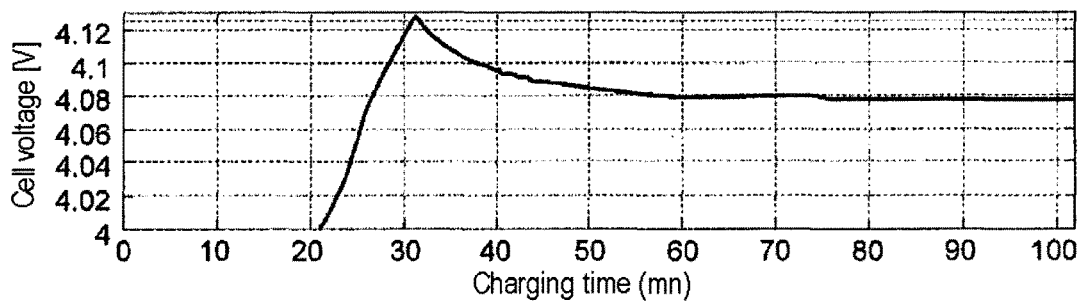
FIG. 5A is a graph showing the voltage across the terminals of a battery cell as a function of time, when a fourth exemplary method according to one embodiment of the invention is applied.
Figure 5B:
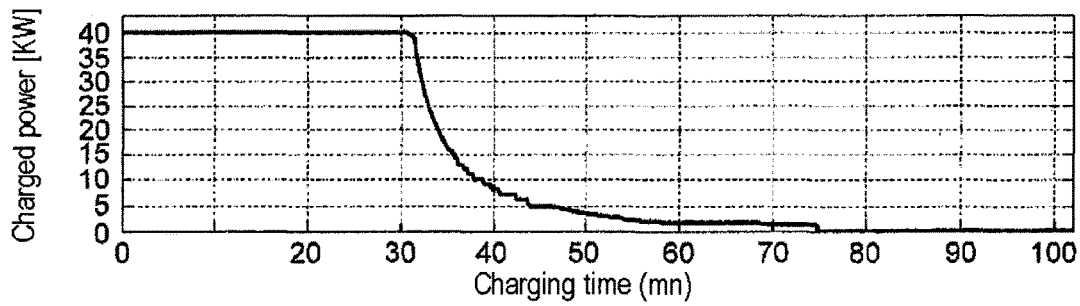
FIG. 5B is a graph showing the charge power in kW as a function of the charging time, during the application of this fourth exemplary method.

FIGS. 5A and 5B illustrate another embodiment in which, during the fast charge phase, the battery is charged up until the voltage across its terminals reaches 4.126 volts, and in which a power profile is directly applied that is determined based on a modeling of the battery. In other words, the target voltage varies progressively with the charge before reaching 4.08 volts. This strategy is relatively advantageous in that the charging time is only around 75 mn.

When the temperature is lower, the gain in time may be even more significant.

For example, for an external temperature of 15° C., when a method known from the prior art is applied, in which, during a fast charge phase, the battery is charged up with a constant current until it reaches a voltage of 4.08 volts, then, when the voltage across the terminals of the battery reaches 4.08 volts, the charging is carried out at a constant voltage equal to 4.08 volts and the charging time is around 103 mn.

When a step-wise charging strategy is applied, in other words the charging is carried out at constant current for as long as the voltage across the terminals of the battery is below 4.08 volts, then, when the voltage across the terminals of the battery reaches 4.08 volts, the value of the charge current is reduced by applying a factor 0.8 or 0.9, for example, the charging time is close to 113 mn.

When the external temperature is 15° C. and a charging strategy is applied with:
- a fast charge phase with a constant power as long as the voltage across the terminals of battery is less than 4.08V, then a power profile until the voltage across the terminals of the battery reaches 4.126 volts, and
- an absorption phase in which the voltage across the terminals of the battery is held at 4.08 volts, the external temperature being less than 15° C.,
the charging time is slightly longer than 100 mn.

When the external temperature is 15° C. and a strategy is applied with:
- a fast charge phase with a constant power for as long as the voltage across the terminals of battery is less than 4.08V, then a power profile until the voltage across the terminals of the battery reaches 4.126 volts, then
- an absorption phase where the voltage is held at 4.1 V for 10 mn and is then held at 4.08 volts,
the charging time is close to 101 minutes.

Figure 6A:
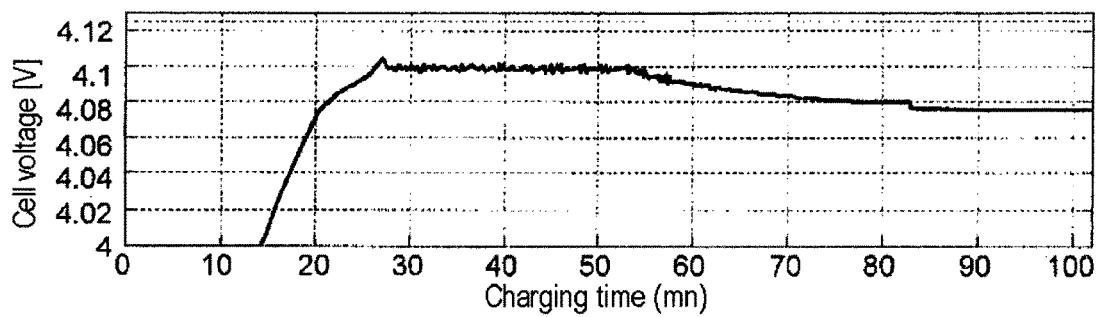
FIG. 6A is a graph showing the voltage across the terminals of a battery cell as a function of time, when a fifth exemplary method according to one embodiment of the invention is applied.
Figure 6B:
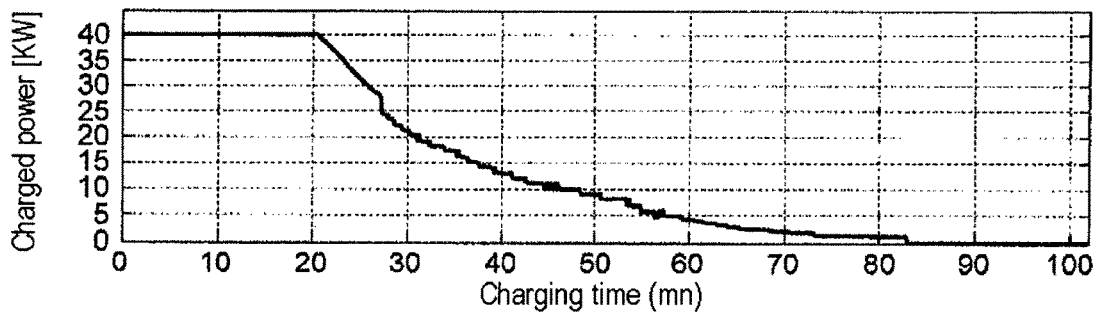
FIG. 6B is a graph showing the charge power in kW as a function of the charging time, during the application of this fifth exemplary method.

With reference to FIGS. 6A and 6B, a strategy is applied with:
- a fast charge phase with a constant power for as long as the voltage across the terminals of battery is less than 4.08V, then a power profile until the voltage across the terminals of the battery reaches 4.126 volts, then
- an absorption phase with a voltage held at 4.1V until around t=56 minutes, then a power profile,
the charging time is close to 86 minutes.

It could be noted that the fast charge phase may take place over several stages, here a first stage with a constant power and a second stage with a power following a decreasing profile. The application of this profile can be advantageous in that it can allow the drop in charge power to be reduced when going from the fast charge phase to the absorption phase.

Figure 7A:
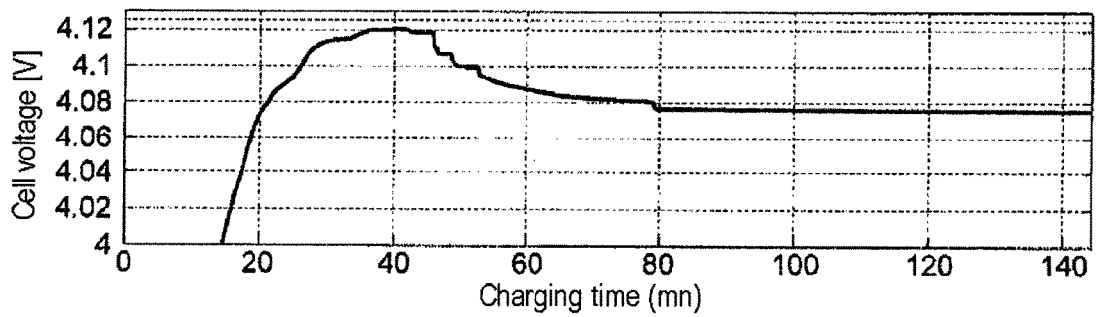
FIG. 7A is a graph showing the voltage across the terminals of a battery cell as a function of time, when a sixth exemplary method according to one embodiment of the invention is applied.
Figure 7B:
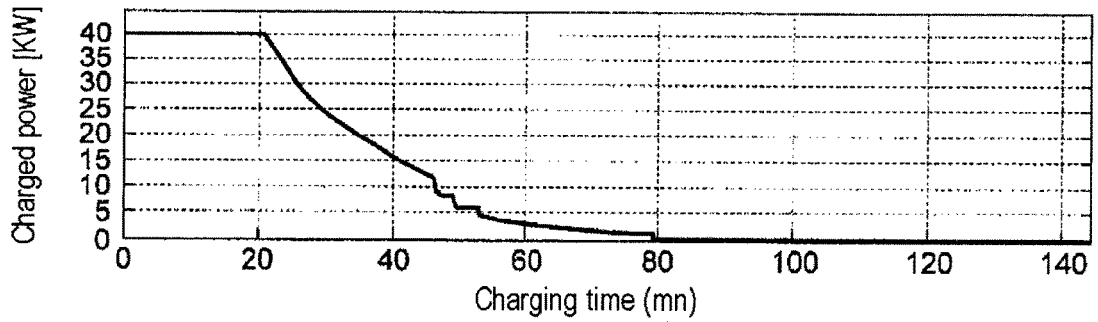
FIG. 7B is a graph showing the charge power in kW as a function of the charging time, during the application of this sixth exemplary method.

In the embodiment in FIGS. 7A and 7B, the strategy in FIGS. 5A and 5B is applied, the external temperature being 15° C. The charging time then goes below 80 minutes. The invention can thus be particularly advantageous when the external temperature is relatively low.

It could be noted that, in these FIGS. 2A to 7B, the sampling rate is relatively high, so that some points do not appear.

The invention claimed is:

1. A method for management of the charge of a battery comprising:
   controlling a fast charge phase at increasing voltage with respect to the battery; and
   controlling an absorption phase at decreasing current regulated at a first voltage value which is a predetermined maximum voltage of the battery corresponding to a desired charged capacity of the battery,
   wherein the fast charge phase is controlled until a voltage across terminals of the battery reaches a second voltage value greater than the first voltage value.

2. The method as claimed in claim 1, wherein during at least a part of the fast charge phase, a charge current or a charge power is held constant.

3. The method as claimed in claim 1, wherein during at least a part of the absorption phase, the voltage across the terminals of the battery is held constant.

4. The method as claimed in claim 1, further comprising:
   during at least a part of the absorption phase,
   (a) imposing a constant charge current or charge power;
   (b) comparing a value of the voltage across the terminals of the battery with a threshold;
   (c) reducing, if the value of the voltage across the terminals of the battery reaches or exceeds said threshold, a value of the charge current or of the charge power; and
   (d) iterating the steps (a) to (d).

5. The method as claimed in claim 1, further comprising:
   imposing, during at least a pan of the absorption phase, a power or current profile, said profile being determined based on a modeling of the battery.

6. The method as claimed in claim 1, wherein the first charge phase corresponds to a boost charging of the battery.

7. A non-transitory computer-readable medium having stored thereon computer-readable instructions which when executed by a computer cause the computer to perform a method comprising:

controlling a fast charge phase at increasing voltage with respect to a battery; and controlling an absorption phase at decreasing current regulated at a first voltage value which is a predetermined maximum voltage of the battery corresponding to a desired charged capacity of the battery, wherein the fast charge phase is controlled until a voltage across terminals of the battery reaches a second voltage value greater than the first voltage value.

8. A device configured to manage a charge of a battery of an automobile vehicle, the device comprising:

one or more sensors configured to measure voltage values across terminals of the battery; and processing circuitry configured to control a fast charge phase at increasing voltage with respect to the battery, and an absorption phase at decreasing current regulated at a first voltage value which is a predetermined maximum voltage of the battery corresponding to a desired charged capacity of the battery, wherein the fast charge phase is controlled until the first voltage value received across the terminals of the battery reaches a second voltage value higher than the first voltage value.

9. An automobile vehicle comprising:

a drive battery; and a device for managing a charge of said battery, the device having one or more sensors configured to measure voltage values across terminals of the battery; and processing circuitry configured to control a fast charge phase at increasing voltage with respect to the drive battery, and an absorption phase at decreasing current regulated at a first voltage value which is a predetermined maximum voltage of the drive battery corresponding to a desired charged capacity of the battery, wherein the fast charge phase is controlled until the first voltage value received across the terminals of the battery reaches a second voltage value higher than the first voltage value.

* * * * *